Oct. 6, 1942.  C. H. BISSELL ET AL  2,297,824
CONDUIT OUTLET BOX
Filed March 20, 1941  2 Sheets-Sheet 1
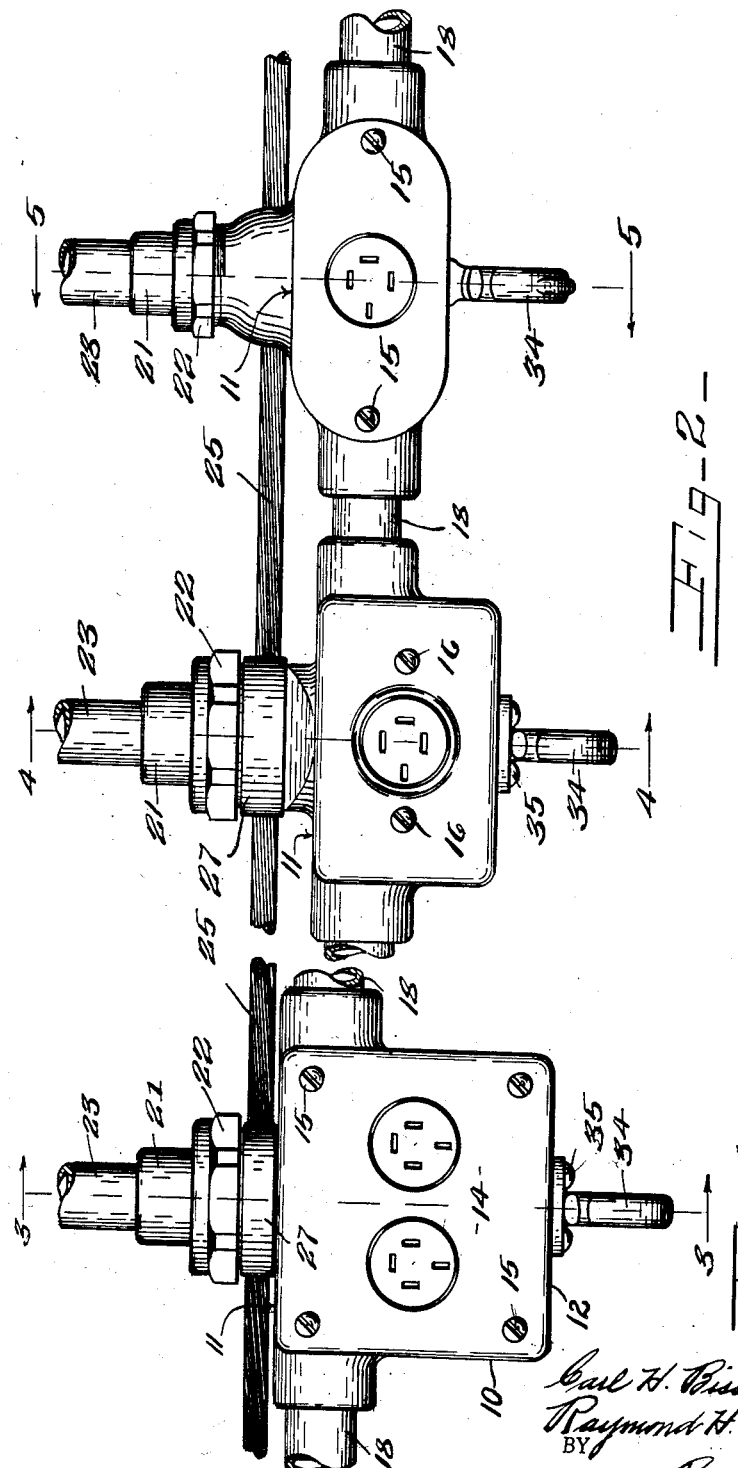
INVENTORS
Carl H. Bissell
Raymond H. Olley.
BY
Bidell & Thompson
ATTORNEYS.

Oct. 6, 1942.　　C. H. BISSELL ET AL　　2,297,824
CONDUIT OUTLET BOX
Filed March 20, 1941　　2 Sheets-Sheet 2
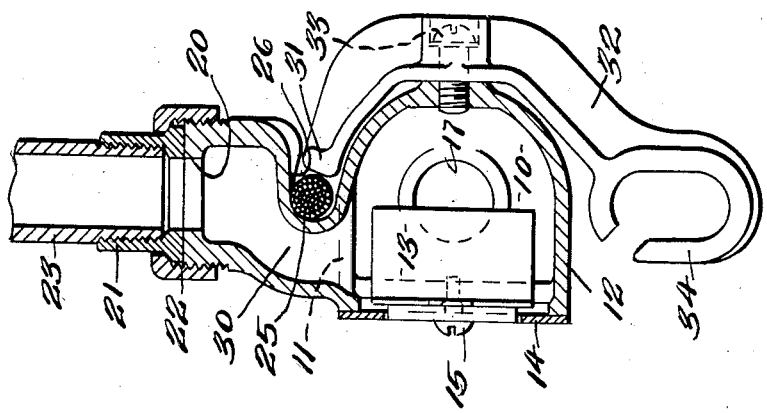
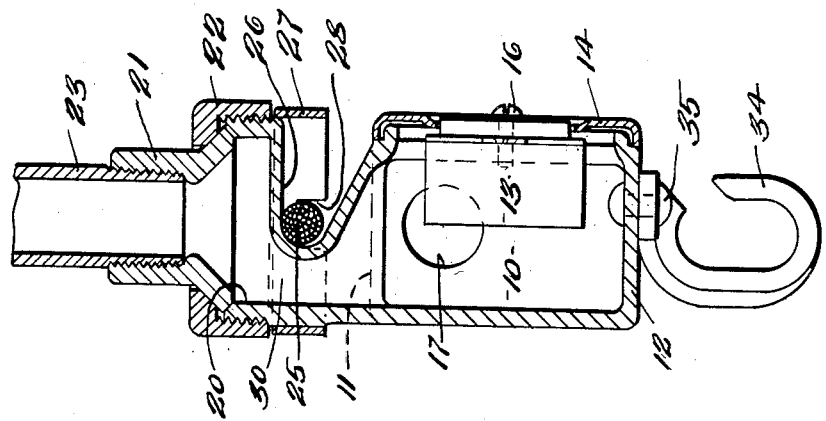
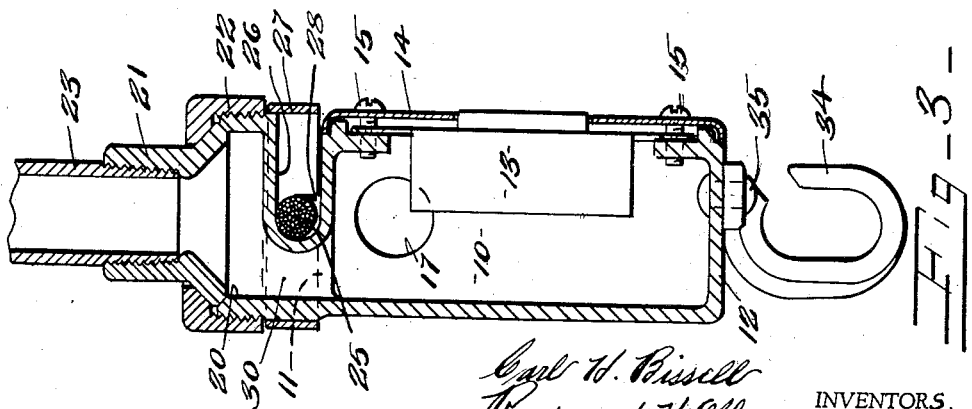
INVENTORS.
Carl H. Bissell
Raymond H. Olley
BY Bodell & Thompson
ATTORNEYS.

Patented Oct. 6, 1942

2,297,824

UNITED STATES PATENT OFFICE 2,297,824

CONDUIT OUTLET BOX

Carl H. Bissell and Raymond H. Olley, Syracuse, N. Y., assignors to Crouse-Hinds Company, Syracuse, N. Y., a corporation of New York Application March 20, 1941, Serial No. 384,370

9 Claims. (Cl. 174—41)

This invention relates to conduit outlet boxes intended particularly for installation in the lighting system of modern manufacturing plants. Such plants are constructed with a relatively high ceiling necessitating a conduit installation arranged an appreciable distance below the ceiling in order that the lighting fixtures may effect proper illumination and whereby the connections between the lighting fixtures and the conduit installation may be accessible without employing extremely long ladders, or the building of staging.

Such installations are at the present time installed by stringing a supporting or messenger cable across the room at predetermined intervals and suspending the conduit installation from the cable. The conduit installation is provided with numerous outlet boxes, each of which is provided with some form of a fixture hanging hook from which the lighting fixture is suspended, and a suitable receptacle is arranged in the outlet box so that the leads or wires from the lighting fixture can be plugged into the receptacle, all whereby the conduit system is arranged an appreciable distance below the ceiling or within relatively convenient access from the floor, and each lighting fixture may be conveniently unhooked and electrically disconnected from the conduit installation for repairs or replacements.

This invention has to do particularly with conduit outlet boxes for such an installation. At the present time, it is conventional practice to use conduit outlet boxes of conventional structure and attach thereto a suitable hook or clamp, whereby the boxes of the conduit run may be secured to the messenger cable and the hook structure also affords means for supporting the individual lighting fixtures. In other installations, the box is provided with a split hub on the top wall thereof through which the messenger cable is extended and a nut screwed on the hub to thereby secure the box to the cable. This latter arrangement is unsatisfactory inasmuch as it admits moisture and dust into the interior of the box.

This invention has as an object a conduit outlet box of the type referred to embodying a particularly economical construction permitting the box to be conveniently and detachably secured to the messenger or supporting cable, and the structure is such that the box is entirely enclosed thus excluding moisture, dirt, and all foreign material from the conduit system.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a box embodying our invention and showing contiguous portions of the messenger cable and conduit runs.

Figure 2 is a view, similar to Figure 1, illustrating boxes embodying a slightly modified construction from that shown in Figure 1.

Figure 3 is a view taken on line 3—3, Figure 1.
Figure 4 is a view taken on line 4—4, Figure 1.
Figure 5 is a view taken on line 5—5, Figure 1.

The outlet box consists of a body having end walls 10, top wall 11, and a bottom wall 12. One of the side walls is formed with an opening to receive a suitable plug receptacle 13, or similar device, and provision is made for a suitable cover 14 detachably secured to the side wall of the box, as by screws 15, or to the receptacle as by screws 16. Opposite end walls 10 are provided with alined apertures 17 to receive the conduit run 18. As here shown, the box is formed with an opening or aperture 20 in the top wall thereof, and a coupling sleeve 21 and nut 22 are employed to detachably secure a vertical conduit run 23 to the box.

In most instances, the lighting fixture employs an incandescent bulb or fluorescent tube, in which event the upwardly extending conduit runs 23 are not employed. These runs are employed in connection with special lighting fixtures which require separate and additional apparatus, as for instance the high intensity mercury vapor lamps which require a starting transformer. In the latter instance, the transformer is housed in a suitable box connected in the vertical runs 23 which continue upwardly and are attached in another conduit run arranged on the ceiling, or positioned above the conduit run of the lighting installation.

The horizontal conduit run 18 and the outlet boxes and the lighting fixtures depending therefrom are all supported by the messenger cable 25. It will be understood by those familiar with these installations that the messenger cable 25 is strung across the room and adequately secured at each end to the side walls thereof. One of the side walls of the box extends inwardly to form a groove or channel 26 which extends parallel to the axis of the conduit receiving aperture 17, and the arrangement is such that when the messenger cable 25 is positioned in the channel 26, it extends parallel with the conduit run 18 and a short distance above the same.

Means is provided for detachably securing or retaining the messenger cable 25 in the channel 26. As shown in Figures 1, 3 and 4, the side walls of the box continue upwardly and so merge with the top wall as to form a substantially circular hub which is threaded externally to receive the coupling nut 22. This hub portion is encircled by an annular member 27 formed with diametrically arranged notches 28. After the channel formation 26 has been passed over the messenger cable, the annular member 27 is positioned on the hub portion of the top wall with the notches 28 receiving the top side of the cable 25. The annular member 27 is thus held against rotation by the cable and is held against upward movement by the coupling nut 22, all whereby the box is quickly and conveniently attached to the supporting cable. The space 30, intermediate the bight or bottom wall of the channel 26 and the opposite side wall of the box, permits conductors to be conveniently extended from the interior of the box into the vertical conduit runs 23.

In the box shown to the right Figure 2, and in section Figure 5, the cable is detachably retained in the channel by the tail portion 31 of a U shaped member 32 detachably secured to the side wall of the box as by screw 33, and the lower leg of the member 32 is formed with a suitable fixture hanging hook 34. As illustrated in Figures 3 and 4, the fixture hanging hooks 34 are secured to the bottom wall 12 of the box as by rivets 35. In either case, it will be observed that the conduit run 18 and the fixture hanging hooks 34 are in vertical alinement with the messenger cable 25 while at the same time the box is of integral closed formation thus preventing the entrance of any foreign matter into the conduit system.

What we claim is:

1. A conduit outlet box provided with conduit receiving apertures, one side wall of the box extending inwardly and forming a cable receiving channel, and means cooperable with the box to detachably secure a messenger cable in said channel.

2. A conduit outlet box comprising a body formed with conduit receiving apertures in certain of the side walls thereof and a conduit receiving apertures in the top wall of the box, one side wall of the box being formed with a channel arranged intermediate the top wall aperture and said side wall apertures to receive a messenger cable, and means cooperable with the body to detachably secure a cable in said channel.

3. A conduit outlet box provided with alined conduit receiving apertures in opposite end walls, one side wall of the box extending inwardly and forming a cable receiving channel extending parallel to the axis of said apertures, and means cooperable with the box to detachably secure a messenger cable in said channel.

4. A conduit outlet box provided with alined conduit receiving apertures in opposite end walls, one side wall of the box extending inwardly and forming a cable receiving channel extending parallel to the axis of said apertures, and means cooperable with the box to detachably secure a messenger cable in said channel, and a fixture hanging hook depending from the box.

5. A conduit outlet box comprising a body provided with alined conduit receiving apertures in opposite end walls thereof and a conduit receiving aperture in the top wall of the box, one side wall of the box being formed with a channel arranged intermediate the top wall aperture and said side wall apertures and extending parallel with the axis of the latter to receive a messenger cable, and means cooperable with the body to detachably secure a cable in said channel.

6. A conduit outlet box comprising a body provided with alined conduit receiving apertures in opposite end walls thereof and a conduit receiving aperture in the top wall of the box, one side wall of the box being formed with a channel arranged intermediate the top wall aperture and said side wall apertures and extending parallel with the axis of the latter to receive a messenger cable, and means cooperable with the body to detachably secure a cable in said channel, and a fixture supporting hook depending from the body.

7. A conduit outlet box comprising a body formed with alined conduit receiving apertures in the end walls thereof, the top wall of said body being also formed with a conduit receiving aperture and a conduit coupling for detachably securing a conduit to said top wall aperture, one side wall of the body extending inwardly and forming a cable receiving channel extending parallel to the axis of said end wall apertures, and means cooperable with said coupling to detachably secure a cable in said channel.

8. A conduit outlet box comprising a body formed with alined conduit receiving apertures in the end walls thereof, one side wall of the box extending inwardly and forming a cable receiving channel extending parallel to the axis of said apertures, a fixture supporting hook detachably secured to the box and being operable to secure a messenger cable in said channel.

9. A conduit outlet box provided with alined conduit apertures in opposite end walls, the top wall of said box being formed with an opening, a conduit coupling operable to detachably secure a conduit to the top wall of the box in register with said opening, one side wall of the box extending inwardly adjacent said top wall and forming a cable receiving channel, an annular member encircling the upper portion of the box and being cooperable with said coupling to retain a messenger cable in said channel.

CARL H. BISSELL.
RAYMOND H. OLLEY.